US012775183B2

(12) United States Patent
Wu et al.

(10) Patent No.: US 12,775,183 B2
(45) Date of Patent: Oct. 27, 2026

(54) REFLECTIVE DISPLAY PANEL

(71) Applicant: HannStar Display Corporation, Taipei City (TW)

(72) Inventors: Wei Chi Wu, Taipei City (TW); Wei-Chih Hsu, Taipei City (TW); Yao-Chih Chuang, Taipei City (TW); Chao-Yun Wu, Taipei City (TW); Yen-Chung Chen, Taipei City (TW)

(73) Assignee: HannStar Display Corporation, Taipei City (TW)

( * ) Notice: Subject to any disclaimer, the term of this patent is extended or adjusted under 35 U.S.C. 154(b) by 173 days.

(21) Appl. No.: 18/935,669

(22) Filed: Nov. 4, 2024

(65) Prior Publication Data

US 2026/0010033 A1 Jan. 8, 2026

(30) Foreign Application Priority Data

Jul. 5, 2024 (TW) ................................ 113125275

(51) Int. Cl.
*G02F 1/133* (2006.01)
*G02F 1/1335* (2006.01)

(52) U.S. Cl.
CPC .. *G02F 1/133553* (2013.01); *G02F 1/133514* (2013.01); *G02F 1/133531* (2021.01)

(58) Field of Classification Search
CPC ................................................ G02F 1/133514
USPC ......................................................... 349/113
See application file for complete search history.

(56) References Cited

U.S. PATENT DOCUMENTS

| | | | |
|---|---|---|---|
| 8,013,962 B2 | 9/2011 | Nishino et al. | |
| 11,287,692 B1 * | 3/2022 | Pickard ............. | G02F 1/133514 |
| 2008/0079873 A1 | 4/2008 | Utsumi et al. | |
| 2008/0273150 A1 | 11/2008 | Iijima et al. | |
| 2022/0109128 A1 | 4/2022 | Fukagawa et al. | |

FOREIGN PATENT DOCUMENTS

| | | |
|---|---|---|
| CN | 105629571 | 6/2016 |
| CN | 111427235 | 7/2020 |
| CN | 115004069 | 9/2022 |
| JP | 2003167243 | 6/2003 |

(Continued)

OTHER PUBLICATIONS

"Notice of allowance of Japan Counterpart Application", issued on Sep. 26, 2025, p. 1-p. 3.

(Continued)

*Primary Examiner* — Christopher M Raabe
(74) *Attorney, Agent, or Firm* — JCIPRNET

(57) ABSTRACT

A reflective display panel including a first substrate, a second substrate, a liquid crystal layer, a pixel driving layer, a color filter layer, and a polarizer. The pixel driving layer is provided with a reflective layer overlapping the color filter layer. Absorbance of a first filter pattern of the color filter layer is greater than or equal to 0.25 and less than or equal to 0.9 in a wavelength range between 530 nm and 580 nm. Absorbance of a second filter pattern of the color filter layer is greater than or equal to 0.8 and less than or equal to 1.25 in a wavelength range between 630 nm and 680 nm. Absorbance of a third filter pattern of the color filter layer is greater than or equal to 0.95 and less than or equal to 1.3 in a wavelength range between 580 nm and 630 nm.

20 Claims, 4 Drawing Sheets

(56) References Cited

FOREIGN PATENT DOCUMENTS

| | | | | |
|---|---|---|---|---|
| JP | 2010230790 | | 10/2010 | |
| KR | 20180003662 A | * | 1/2018 | ....... G02F 1/136286 |
| TW | 201536871 | | 10/2015 | |
| WO | 2021221122 | | 11/2021 | |

OTHER PUBLICATIONS

"Office Action of Taiwan Counterpart Application", issued on Apr. 16, 2025, p. 1-p. 4.

"Search Report of Europe Counterpart Application", issued on May 27, 2025, p. 1-p. 8.

* cited by examiner

REFLECTIVE DISPLAY PANEL

CROSS-REFERENCE TO RELATED APPLICATION

This application claims the priority benefit of Taiwan application serial no. 113125275, filed on Jul. 5, 2024. The entirety of the above-mentioned patent application is hereby incorporated by reference herein and made a part of this specification.

BACKGROUND

Technical Field

This disclosure relates to a display panel, and in particular to a reflective display panel.

Description of Related Art

Reflective display panels have the advantage of low power consumption, which adds to their benefits in many applications. In some current product applications, reflective display panels tend to have a preference for a white background color, such as electronic labels or e-readers. In one of the existing reflective display panels, the film thickness must be controlled to be between 1200 Å and 1700 Å in order for the transparent electrode layer to have high conductivity. However, this range of film thickness tends to cause a yellowish background color for the reflective display panel, which in turn affects the display.

SUMMARY

The disclosure provides a reflective display panel whose background color is closer to white.

The reflective display panel of the disclosure includes a first substrate, a second substrate, a liquid crystal layer, a pixel driving layer, a color filter layer, and a polarizer. The first substrate and the second substrate are disposed overlapping with each other. The liquid crystal layer is disposed between the first substrate and the second substrate. The pixel driving layer is disposed on the first substrate, and has a reflective layer. The color filter layer is disposed on the second substrate and overlapped with the reflective layer. The color filter layer includes a first filter pattern, a second filter pattern, and a third filter pattern. Absorbance of the first filter pattern in a wavelength range between 630 nm and 780 nm is less than 0.05, and absorbance in a wavelength range between 530 nm and 580 nm is greater than or equal to 0.25 and less than or equal to 0.9. Absorbance of the second filter pattern in a wavelength range between 480 nm and 580 nm is less than 0.1, and absorbance in a wavelength range between 630 nm and 680 nm is greater than or equal to 0.8 and less than or equal to 1.25. Absorbance of the third filter pattern in a wavelength range between 430 nm and 480 nm is less than 0.1, and absorbance in a wavelength range between 580 nm and 630 nm is greater than or equal to 0.95 and less than or equal to 1.3. The polarizer is disposed on a side of the liquid crystal layer facing away from the reflective layer, and overlapped with the liquid crystal layer.

In an embodiment of the disclosure, the absorbance of the first filter pattern of the reflective display panel in a wavelength range between 380 nm and 430 nm is greater than or equal to 0.1 and less than or equal to 0.45.

In an embodiment of the disclosure, the absorbance of the first filter pattern of the reflective display panel in the wavelength range between 430 nm and 480 nm is greater than or equal to 0.3 and less than or equal to 0.6.

In an embodiment of the disclosure, the absorbance of the first filter pattern of the reflective display panel in a wavelength range between 480 nm and 530 nm is greater than or equal to 0.45 and less than or equal to 0.85.

In an embodiment of the disclosure, the absorbance of the second filter pattern of the reflective display panel in a wavelength range between 650 nm and 670 nm is greater than or equal to 1 and less than or equal to 1.25.

In an embodiment of the disclosure, the absorbance of the second filter pattern of the reflective display panel in a wavelength range between 495 nm and 555 nm is less than 0.05.

In an embodiment of the disclosure, the absorbance of the second filter pattern of the reflective display panel in a wavelength range between 380 nm and 430 nm is greater than or equal to 0.35 and less than or equal to 0.9.

In an embodiment of the disclosure, the absorbance of the second filter pattern of the reflective display panel in a wavelength range between 385 nm and 400 nm is greater than or equal to 0.6 and less than or equal to 0.9.

In an embodiment of the disclosure, the absorbance of the second filter pattern of the reflective display panel in the wavelength range between 430 nm and 480 nm is less than or equal to 0.45.

In an embodiment of the disclosure, the absorbance of the second filter pattern of the reflective display panel in the wavelength range between 580 nm and 630 nm is greater than or equal to 0.05 and less than or equal to 0.9.

In an embodiment of the disclosure, the absorbance of the second filter pattern of the reflective display panel in a wavelength range between 680 nm and 730 nm is greater than or equal to 0.4 and less than or equal to 1.2.

In an embodiment of the disclosure, the absorbance of the third filter pattern of the reflective display panel in a wavelength range between 380 nm and 430 nm is less than or equal to 0.5.

In an embodiment of the disclosure, the absorbance of the third filter pattern of the reflective display panel in a wavelength range between 480 nm and 530 nm is less than or equal to 0.5.

In an embodiment of the disclosure, the absorbance of the third filter pattern of the reflective display panel in the wavelength range between 530 nm and 580 nm is greater than or equal to 0.4 and less than or equal to 1.1.

In an embodiment of the disclosure, the absorbance of the third filter pattern of the reflective display panel in the wavelength range between 580 nm and 630 nm is greater than or equal to 0.95 and less than or is equal to 1.3.

In an embodiment of the disclosure, the absorbance of the third filter pattern of the reflective display panel in the wavelength range between 630 nm and 680 nm is greater than or equal to 0.65 and less than or equal to 1.1.

In an embodiment of the disclosure, the absorbance of the third filter pattern of the reflective display panel in a wavelength range between 680 nm and 730 nm is greater than or equal to 0.6 and less than or equal to 0.8.

In an embodiment of the disclosure, the absorbance of the third filter pattern of the reflective display panel in a wavelength range between 730 nm and 780 nm is greater than or equal to 0.4 and less than or equal to 0.9.

In an embodiment of the disclosure, the absorbance of the third filter pattern of the reflective display panel in a wavelength range between 745 nm and 770 nm is greater than or equal to 0.68 and less than or equal to 0.9.

In an embodiment of the disclosure, a single hue b* of the polarizer of the reflective display panel is greater than or equal to 0 and less than or equal to 3.3, the reflective display panel is adapted to display a white screen, and the hue b* of the white screen is greater than or equal to −4.1 and less than or equal to 0.4.

Based on the above, in the reflective display panel according to an embodiment of the disclosure, the color filter layer is disposed on and overlapped with the reflective layer of the pixel driving layer. The color filter layer has three filter patterns, and the three filter patterns have absorbance less than 0.1 in three different wavelength ranges. By controlling the absorbance distribution of the three filter patterns in the visible wavelength range, the yellowish background color of the reflective display panel may be significantly improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
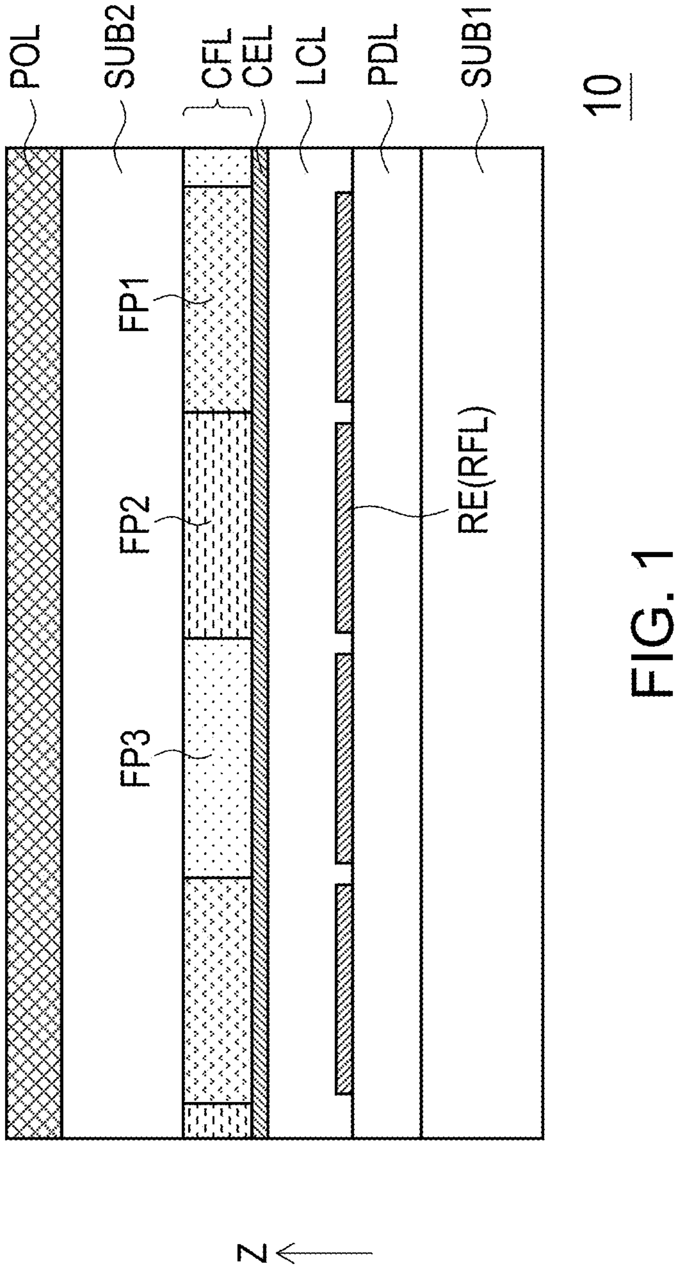
FIG. 1 is a schematic cross-sectional view of a reflective display panel according to an embodiment of the disclosure.

Reference will now be made in detail to the exemplary embodiments of the disclosure, examples of which are illustrated in the accompanying drawings. Whenever possible, the same reference numerals are used in the drawings and descriptions to refer to the same or similar parts.

Figure 2:
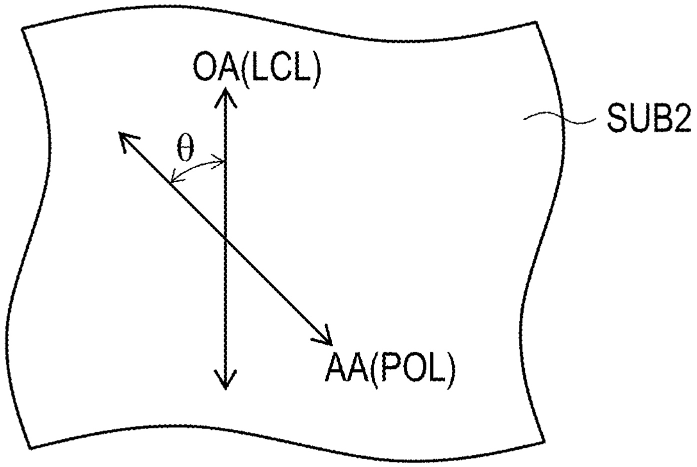
FIG. 2 is a schematic view of an axial relationship between an absorption axis of a polarizer and an optical axis of a liquid crystal layer in FIG. 1.
Figure 3:
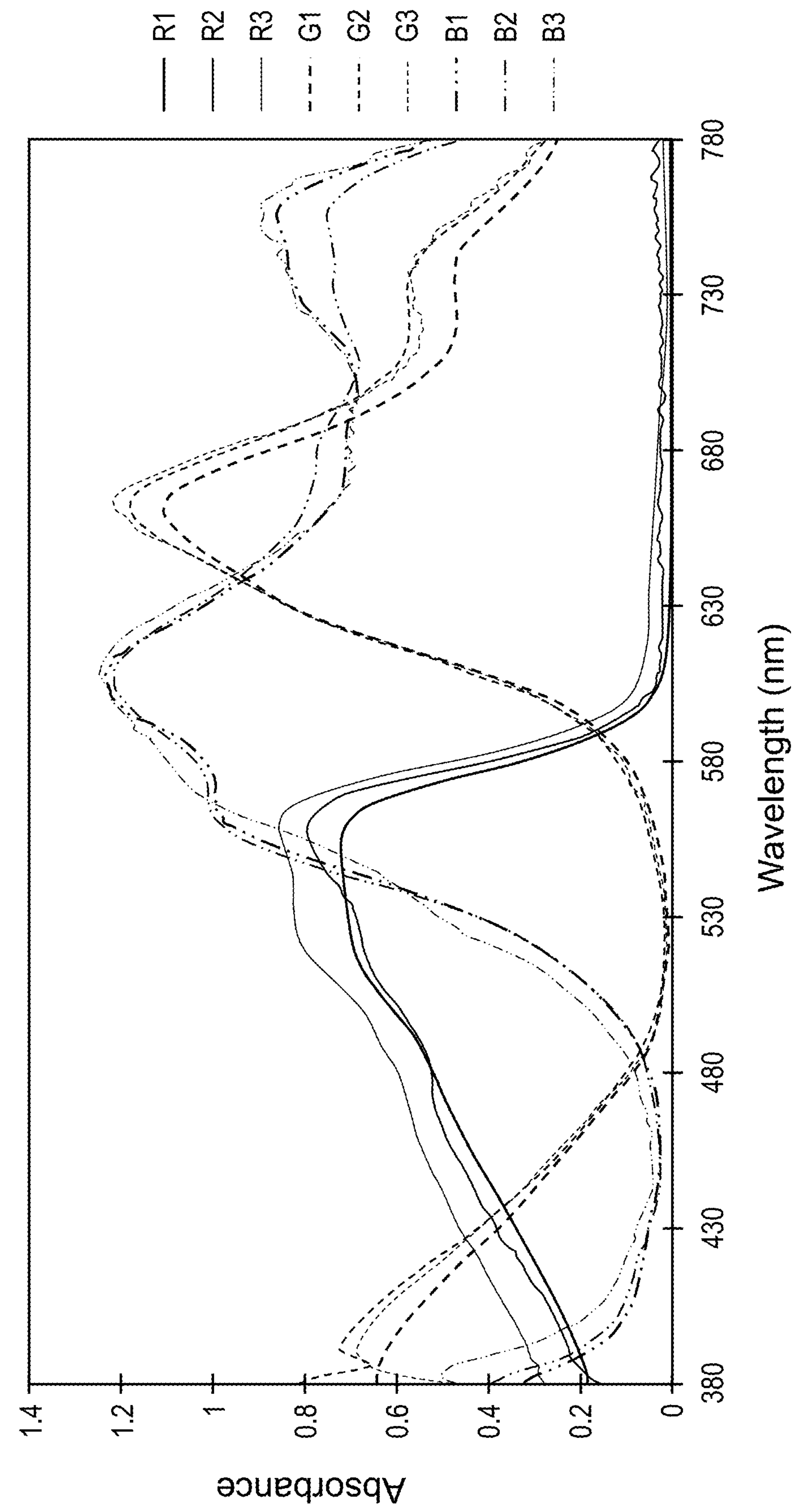
FIG. 3 shows distribution curves of absorbance versus wavelength for three filter patterns of FIG. 1.
Figure 4:
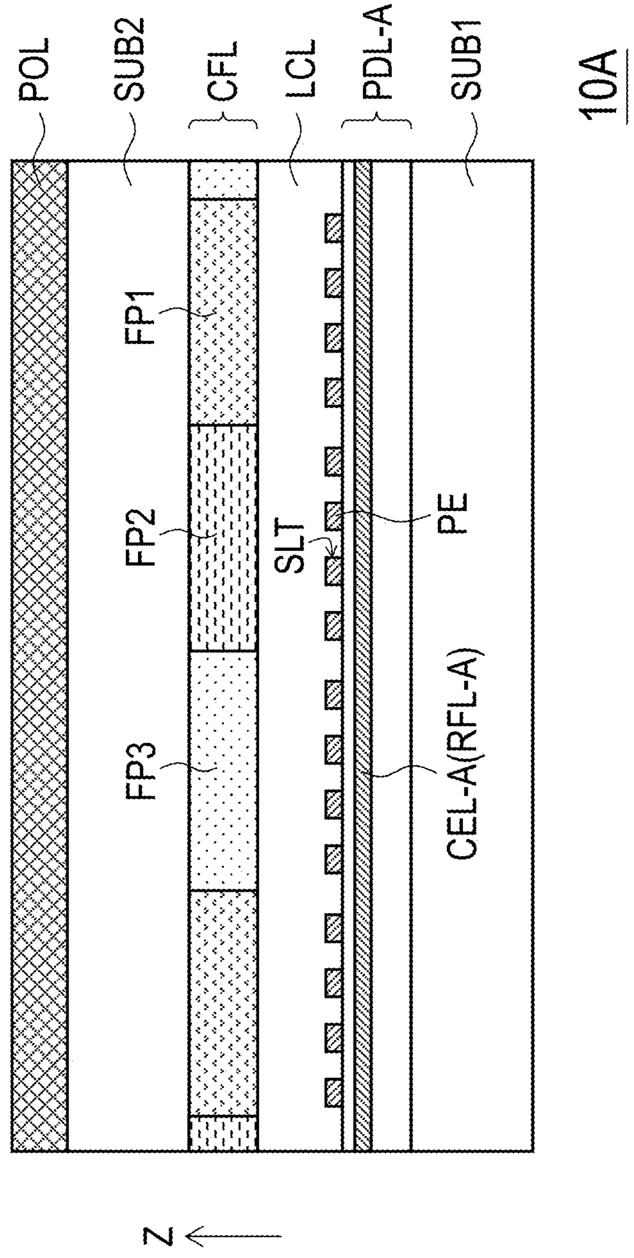
FIG. 4 is a schematic cross-sectional view of a reflective display panel according to another embodiment of the disclosure.

FIG. 1 is a schematic cross-sectional view of a reflective display panel according to an embodiment of the disclosure. FIG. 2 is a schematic view of an axial relationship between an absorption axis of a polarizer and an optical axis of a liquid crystal layer in FIG. 1. FIG. 3 shows distribution curves of absorbance versus wavelength for three filter patterns of FIG. 1. FIG. 4 is a schematic cross-sectional view of a reflective display panel according to another embodiment of the disclosure.

Referring to FIG. 1, a reflective display panel 10 includes a first substrate SUB1, a second substrate SUB2, a liquid crystal layer LCL, and a pixel driving layer PDL. The first substrate SUB1 and the second substrate SUB2 are disposed overlapping with each other, and the liquid crystal layer LCL is disposed between the first substrate SUB1 and the second substrate SUB2. The overlapping relationship means, for example, that the first substrate SUB1 and the second substrate SUB2 overlap with each other in a thickness direction (e.g., a direction Z) of the liquid crystal layer LCL. Unless otherwise mentioned below, the overlapping relationship between the two components is defined in the above-mentioned manner, and therefore the overlapping direction will not be repeated in the following.

The pixel driving layer PDL is disposed on the first substrate SUB1 and has a reflective layer RFL. For example, the pixel driving layer PDL may also be provided with multiple signal lines (not shown) and multiple active elements (not shown). The signal lines may include multiple data lines and multiple scan lines. The data lines and the scan lines can define multiple pixel areas of the reflective display panel 10, and the pixel areas can be respectively provided with the multiple active elements. Each of the active elements can be electrically connected to a corresponding data line and scan line. In this embodiment, the reflective layer RFL can be multiple reflective electrodes RE, and each of the reflective electrodes RE can be electrically connected to an active element, but it is not limited thereto.

In this embodiment, a common electrode layer CEL may be disposed on the second substrate SUB2. The common electrode layer CEL and the reflective electrode RE are adapted to be enabled to modulate phase delay of the liquid crystal layer LCL. The common electrode layer CEL is, for example, a light-transmitting electrode, and a material of the light-transmitting electrode includes metal oxide, such as indium tin oxide, indium zinc oxide, aluminum tin oxide, aluminum zinc oxide, or other suitable oxide, or a stacked layer of at least two of the above. In this embodiment, a thickness of the common electrode layer CEL in the direction Z may range from 120 nm to 170 nm, but is not limited thereto.

For example, in this embodiment, the liquid crystal layer LCL can be driven in an electrically controlled birefringence (ECB) mode, but is not limited thereto. In other embodiments, the liquid crystal layer LCL can also be driven in a twisted nematic (TN) mode.

It should be noted first that when the reflective electrode RE and the common electrode layer CEL are not enabled, the liquid crystal layer LCL can have a maximum phase delay, and the reflective display panel 10 displays a white screen at this time. The white screen can be used as a background color of the reflective display panel 10. The maximum phase delay is, for example, defined by (ne-no)d, where ne is an extraordinary refractive index of the liquid crystal layer LCL, no is an ordinary refractive index of the liquid crystal layer LCL, and d is a thickness of the liquid crystal layer LCL in the thickness direction Z.

However, the disclosure is not limited thereto. In another embodiment, a pixel driving layer PDL-A of a reflective display panel 10A may also be provided with a common electrode layer CEL-A (as shown in FIG. 4). That is, the common electrode layer CEL-A is disposed on the first substrate SUB1. In particular, the common electrode layer CEL-A can simultaneously serve as a reflective layer RFL-A of the reflective display panel 10A, that is, the common electrode layer CEL-A can be a reflective electrode. Thus, in the embodiment of FIG. 4, a pixel electrode PE made of a transparent conductive material can replace the reflective electrode RE of FIG. 1, and the pixel electrode PE can have multiple micro-slits SLT. More specifically, in this embodiment, the liquid crystal layer LCL is driven in a fringe-field switching (FFS) mode, for example. In other variant embodiments, the liquid crystal layer LCL can also be driven in an in-plane switching (IPS) mode.

Please refer to FIG. 1 and FIG. 2. The reflective display panel 10 also includes a polarizer POL disposed on a side of the liquid crystal layer LCL facing away from the reflective layer RFL. In this embodiment, the polarizer POL is, for example, disposed on a side surface of the second substrate SUB2 facing away from the liquid crystal layer LCL, and an angle θ between projections of an absorption axis AA of the polarizer POL and an optical axis OA of the liquid crystal layer LCL on the second substrate SUB2 is, for example, 45 degrees, but is not limited thereto.

In order to achieve a color display, the reflective display panel 10 also includes a color filter layer CFL disposed on the second substrate SUB2 and overlapping with the reflective layer RFL. The color filter layer CFL is located between the second substrate SUB2 and the common electrode layer CEL, and is suitable for allowing visible light to pass through. In this embodiment, the color filter layer CFL includes multiple filter patterns, such as a first filter pattern FP1, a second filter pattern FP2, and a third filter pattern FP3. The filter patterns are respectively overlapped with the multiple reflective electrodes RE of the reflective layer RFL.

For example, in this embodiment, the first filter pattern FP1, the second filter pattern FP2, and the third filter pattern FP3 are suitable for allowing red light, green light, and blue light to pass through respectively. Please refer to FIG. 1 and FIG. 3. More specifically, absorbance of the first filter pattern FP1 in a wavelength range between 630 nm and 780 nm is less than 0.05 (as shown by a curve R1 to a curve R3). Absorbance of the second filter pattern FP2 in a wavelength range between 480 nm and 580 nm is less than 0.1 (as shown in a curve G1 to a curve G3). Absorbance of the third filter pattern FP3 in a wavelength range between 430 nm and 480 nm is less than 0.1 (as shown in a curve B1 to a curve B3). In this way, the background color of the reflective display panel 10 is closer to white.

In particular, the current reflective display panel is prone to displaying a yellowish background color due to the arrangement of the polarizer POL and the common electrode layer CEL. In order to solve this problem, in the color filter layer CFL of this embodiment, absorbance distributions of the first filter pattern FP1, the second filter pattern FP2, and the third filter pattern FP3 in different wavelength ranges of a visible light wavelength range are specially designed.

In detail, as shown in the curves R1 to R3 of FIG. 3, the absorbance of the first filter pattern FP1 in a wavelength range between 380 nm and 430 nm is greater than or equal to 0.1 and less than or equal to 0.45. The absorbance of the first filter pattern FP1 in the wavelength range between 430 nm and 480 nm is greater than or equal to 0.3 and less than or equal to 0.6. The absorbance of the first filter pattern FP1 in a wavelength range between 480 nm and 530 nm is greater than or equal to 0.45 and less than or equal to 0.85. The absorbance of the first filter pattern FP1 in a wavelength range between 530 nm and 580 nm is greater than or equal to 0.25 and less than or equal to 0.9. The absorbance of first filter pattern FP1 in a wavelength range between 580 nm and 630 nm is greater than or equal to 0.05 and less than or equal to 0.45.

As shown in the curves G1 to G3 in FIG. 3, the absorbance of the second filter pattern FP2 in the wavelength range between 380 nm and 430 nm is greater than or equal to 0.35 and less than or equal to 0.9. The absorbance of the second filter pattern FP2 in the wavelength range between 430 nm and 480 nm is less than or equal to 0.45. The absorbance of the second filter pattern FP2 in a wavelength range between 495 nm and 555 nm is less than 0.05. The absorbance of the second filter pattern FP2 in the wavelength range between 580 nm and 630 nm is greater than or equal to 0.05 and less than or equal to 0.9. The absorbance of the second filter pattern FP2 in a wavelength range between 650 nm and 670 nm is greater than or equal to 1 and less than or equal to 1.25. The absorbance of the second filter pattern FP2 in a wavelength range between 630 nm and 680 nm is greater than or equal to 0.8 and less than or equal to 1.25. The absorbance of the second filter pattern FP2 in a wavelength range between 680 nm and 730 nm is greater than or equal to 0.4 and less than or equal to 1.2.

As shown in the curves B1 to B3 in FIG. 3, the absorbance of the third filter pattern FP3 in the wavelength range between 380 nm and 430 nm is less than or equal to 0.5. The absorbance of the third filter pattern FP3 in the wavelength range between 480 nm and 530 nm is less than or equal to 0.5. The absorbance of the third filter pattern FP3 in the wavelength range between 530 nm and 580 nm is greater than or equal to 0.4 and less than or equal to 1.1. The absorbance of the third filter pattern FP3 in the wavelength range between 580 nm and 630 nm is greater than or equal to 0.95 and less than or equal to 1.3. The absorbance of the third filter pattern FP3 in the wavelength range between 630 nm and 680 nm is greater than or equal to 0.65 and less than or equal to 1.1. The absorbance of the third filter pattern FP3 in the wavelength range between 680 nm and 730 nm is greater than or equal to 0.6 and less than or equal to 0.8. The absorbance of the third filter pattern FP3 in a wavelength range between 730 nm and 780 nm is greater than or equal to 0.4 and less than or equal to 0.9. The absorbance of the third filter pattern FP3 in a wavelength range between 745 nm and 770 nm is greater than or equal to 0.68 and less than or equal to 0.9.

It should be noted that the absorbance of the first filter pattern FP1 in a wavelength range between 550 nm and 560 nm is greater than or equal to 0.7 and less than or equal to 0.9, and has the maximum absorbance in the visible light wavelength range. The absorbance of the second filter pattern FP2 in the wavelength range between 650 nm and 670 nm is greater than or equal to 1.0 and less than or equal to 1.25, and has the maximum absorbance in the visible light wavelength range. The absorbance of the second filter pattern FP2 in a wavelength range between 385 nm and 400 nm is greater than or equal to 0.6 and less than or equal to 0.9, and has a second maximum absorbance in the visible light wavelength range. The absorbance of the third filter pattern FP3 in a wavelength range between 600 nm and 620 nm is greater than or equal to 1.1 and less than or equal to 1.3, and has the maximum absorbance in the visible light wavelength range. The absorbance of the third filter pattern FP3 in the wavelength range between 745 nm and 770 nm is greater than or equal to 0.65 and less than or equal to 0.9, and has the second maximum absorbance in the visible light wavelength range.

Specifically, in this embodiment, a single hue b* of the polarizer POL may be greater than or equal to 0 and less than or equal to 3.3, but is not limited thereto. Through the absorbance distribution design of the first filter pattern FP1, the second filter pattern FP2, and the third filter pattern FP3 in the visible light wavelength range, the problem of yellowish background color (i.e., the white screen) caused by the polarizer POL and the common electrode layer CEL of the reflective display panel 10 may be significantly improved. For example, a hue a* of the white screen of the reflective display panel 10 may be greater than or equal to 0 and less than or equal to 2.8, and the hue b* of the white screen may be greater than or equal to −4.1 and less than or equal to 0.4.

It should be noted that the hue a* and hue b* are numerical parameters used to define colors in the CIELAB color space. If the hue a* is a positive value and the higher the better, the color is reddish; if it is a negative value and the lower the better, the color is greenish. If the hue b* is a positive value and the higher the better, the color is yellowish; if it is a negative value and the lower the better, the color is bluish. When both the hue a* and the hue b* are 0, the color is white. In other words, the reflective display panel 10 of the disclosure does not have the problem of yellowish background color.

To sum up, in the reflective display panel according to an embodiment of the disclosure, the color filter layer is disposed on and overlapped with the reflective layer of the pixel driving layer. The color filter layer has three filter patterns, and the three filter patterns have absorbance less than 0.1 in three different wavelength ranges. By controlling the absorbance distribution of the three filter patterns in the visible wavelength range, the yellowish background color of the reflective display panel may be significantly improved.

Finally, it should be noted that the disclosure is not limited to total reflective display panels, but also applies to display panels containing reflective pixel structures such as semi-transflective or micro-transflective display devices.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A reflective display panel, comprising:

a first substrate and a second substrate, disposed overlapping with each other;

a liquid crystal layer, disposed between the first substrate and the second substrate;

a pixel driving layer, disposed on the first substrate, and having a reflective layer;

a color filter layer, disposed on the second substrate and overlapped with the reflective layer, the color filter layer comprising:

a first filter pattern, wherein absorbance in a wavelength range between 630 nm and 780 nm is less than 0.05, and absorbance in a wavelength range between 530 nm and 580 nm is greater than or equal to 0.25 and less than or equal to 0.9;

a second filter pattern, wherein absorbance in a wavelength range between 480 nm and 580 nm is less than 0.1, and absorbance in a wavelength range between 630 nm and 680 nm is greater than or equal to 0.8 and less than or equal to 1.25; and a third filter pattern, wherein absorbance in a wavelength range between 430 nm and 480 nm is less than 0.1, and absorbance in a wavelength range between 580 nm and 630 nm is greater than or equal to 0.95 and less than or equal to 1.3; and a polarizer, disposed on a side of the liquid crystal layer away from the reflective layer and overlapped with the liquid crystal layer.

2. The reflective display panel according to claim 1, wherein the absorbance of the first filter pattern in a wavelength range between 380 nm and 430 nm is greater than or equal to 0.1 and less than or equal to 0.45.

3. The reflective display panel according to claim 1, wherein the absorbance of the first filter pattern in the wavelength range between 430 nm and 480 nm is greater than or equal to 0.3 and less than or equal to 0.6.

4. The reflective display panel according to claim 1, wherein the absorbance of the first filter pattern in a wavelength range between 480 nm and 530 nm is greater than or equal to 0.45 and less than or equal to 0.85.

5. The reflective display panel according to claim 1, wherein the absorbance of the second filter pattern in a wavelength range between 650 nm and 670 nm is greater than or equal to 1 and less than or equal to 1.25.

6. The reflective display panel according to claim 1, wherein the absorbance of the second filter pattern in a wavelength range between 495 nm and 555 nm is less than 0.05.

7. The reflective display panel according to claim 1, wherein the absorbance of the second filter pattern in a wavelength range between 380 nm and 430 nm is greater than or equal to 0.35 and less than or equal to 0.9.

8. The reflective display panel according to claim 7, wherein the absorbance of the second filter pattern in a wavelength range between 385 nm and 400 nm is greater than or equal to 0.6 and less than or equal to 0.9.

9. The reflective display panel according to claim 1, wherein the absorbance of the second filter pattern in the wavelength range between 430 nm and 480 nm is less than or equal to 0.45.

10. The reflective display panel according to claim 1, wherein the absorbance of the second filter pattern in the wavelength range between 580 nm and 630 nm is greater than or equal to 0.05 and less than or equal to 0.9.

11. The reflective display panel according to claim 1, wherein the absorbance of the second filter pattern in a wavelength range between 680 nm and 730 nm is greater than or equal to 0.4 and less than or equal to 1.2.

12. The reflective display panel according to claim 1, wherein the absorbance of the third filter pattern in a wavelength range between 380 nm and 430 nm is less than or equal to 0.5.

13. The reflective display panel according to claim 1, wherein the absorbance of the third filter pattern in a wavelength range between 480 nm and 530 nm is less than or equal to 0.5.

14. The reflective display panel according to claim 1, wherein the absorbance of the third filter pattern in the wavelength range between 530 nm and 580 nm is greater than or equal to 0.4 and less than or equal to 1.1.

15. The reflective display panel according to claim 1, wherein the absorbance of the third filter pattern in the wavelength range between 580 nm and 630 nm is greater than or equal to 0.95 and less than or is equal to 1.3.

16. The reflective display panel according to claim 1, wherein the absorbance of the third filter pattern in the wavelength range between 630 nm and 680 nm is greater than or equal to 0.65 and less than or equal to 1.1.

17. The reflective display panel according to claim 1, wherein the absorbance of the third filter pattern in a wavelength range between 680 nm and 730 nm is greater than or equal to 0.6 and less than or equal to 0.8.

18. The reflective display panel according to claim 1, wherein the absorbance of the third filter pattern in a wavelength range between 730 nm and 780 nm is greater than or equal to 0.4 and less than or equal to 0.9.

19. The reflective display panel according to claim 18, wherein the absorbance of the third filter pattern in a wavelength range between 745 nm and 770 nm is greater than or equal to 0.68 and less than or equal to 0.9.

20. The reflective display panel according to claim 1, wherein a single hue b* of the polarizer is greater than or equal to 0 and less than or equal to 3.3, the reflective display panel is adapted to display a white screen, and the hue b* of the white screen is greater than or equal to −4.1 and less than or equal to 0.4.

* * * * *